July 6, 1965
J. P. LINDSEY
3,193,671
SIGNAL IDENTIFICATION
Filed March 19, 1962
2 Sheets-Sheet 1
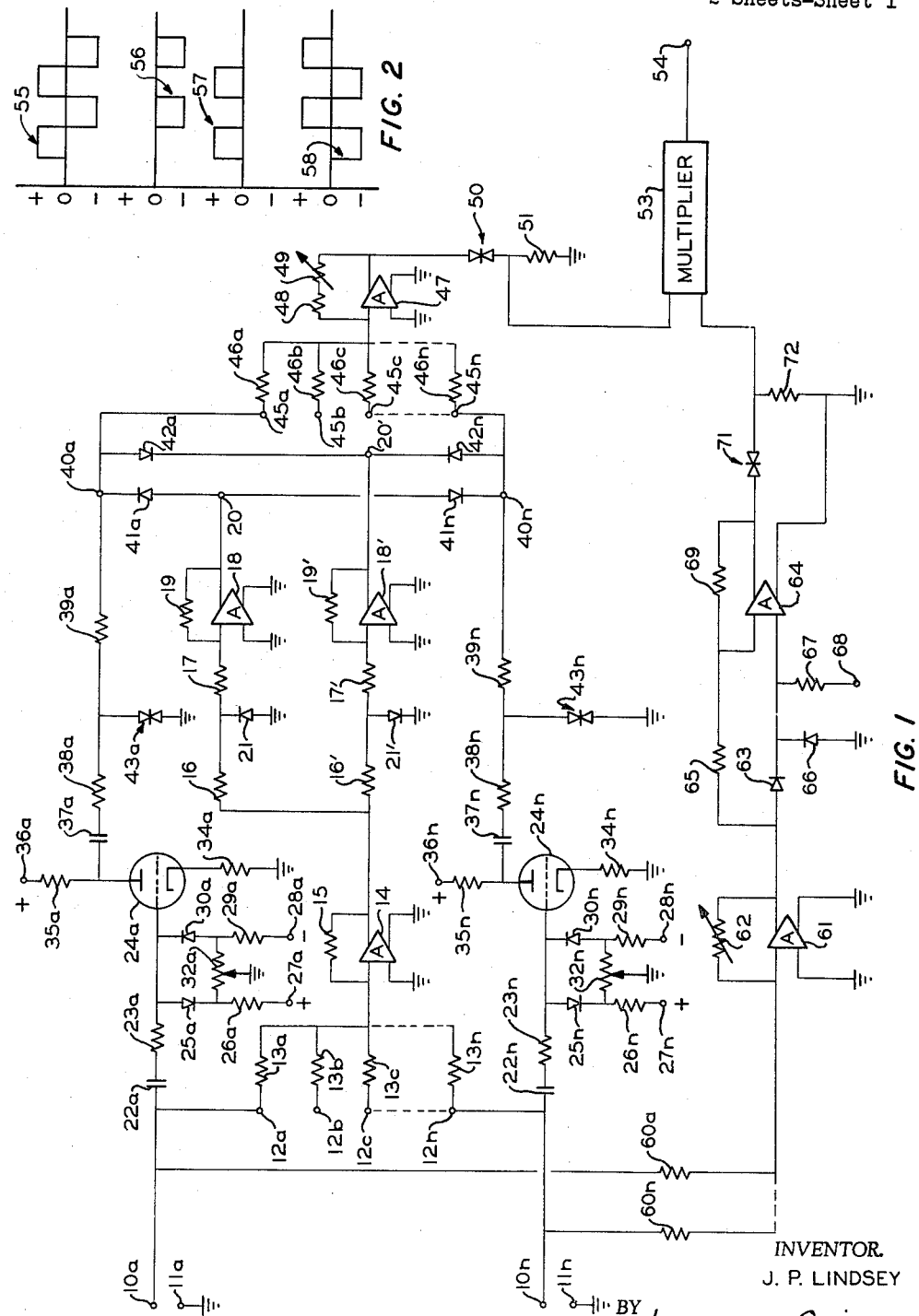
INVENTOR.
J. P. LINDSEY
BY
Young & Quigg
ATTORNEYS July 6, 1965   J. P. LINDSEY   3,193,671
SIGNAL IDENTIFICATION Filed March 19, 1962   2 Sheets-Sheet 2

INVENTOR.
J. P. LINDSEY
BY Young & Quigg
ATTORNEYS

United States Patent Office 3,193,671
Patented July 6, 1965

3,193,671
SIGNAL IDENTIFICATION
Joe P. Lindsey, Bartlesville, Okla., assignor to Phillips Petroleum Company, a corporation of Delaware
Filed Mar. 19, 1962, Ser. No. 180,779
5 Claims. (Cl. 235—193)

This invention relates to the identification of common information in a plurality of signals.

In the field of geophysical prospecting, it is common practice to detonate an explosive near the surface of the earth and record resulting vibrations at a plurality of locations spaced from the explosive charge. This procedure is repeated a number of times at other locations in the area to be surveyed. The recorded vibrations include reflections from subsurface discontinuities. By noting the times of arrival of these reflections in a plurality of records, valuable information is obtained regarding the depths and dips of subsurface reflecting formations. However, it is often extremely difficult, if not impossible, to identify the desired reflections in the presence of random noise vibrations which are also recorded. As a practical matter, visual identification of common reflections in a plurality of records generally cannot be made unless the signal-to-noise ratio is greater than approximately 1.5. Unfortunately, records of this quality cannot always be obtained in many areas.

In my copending application Serial No. 130,919, filed August 11, 1961, there is disclosed a method of and apparatus for recognizing common information in a plurality of signals even in the presence of substantial amounts of noise. This is accomplished by summing the individual signals to provide a composite record. The summing step reduces a substantial amount of noise because random vibrations tend to cancel one another when summed. The individual signals are then compared with the composite record in such a manner that output signals are established whenever the individual signals are in phase with the composite record. These output signals are then summed, the magnitude of the resulting sum being an identification of the degree of correlation between the individual signals and the sum. In one specific embodiment of my earlier application, the composite signal which represents the sum of the initial signals is transmitted through separate clipping circuits which remove the signals above and below preselected values. These clipped signals are then compared with the original signals by means of rectifier circuits which permit the original signals to be transmitted to the final summing circuit only when the signals being compared are in phase with one another.

While the procedure of my earlier application is quite effective to permit the identification of common vibration patterns in a plurality of signals, there is some loss of desired information. It can be demonstrated mathematically that approximately one-third of the desired information in a seismic record is lost through hard clipping. In order to restore part of the information lost through such clipping, an improved signal interpretation procedure has now been developed. The output signal of the apparatus of my prior application is applied as the first input signal to a multiplier. The original signals are summed and applied through a full wave rectifier to establish the second input signal to the multiplier. Since the sum has instantaneous amplitudes which are best representative of the signal components of the original signals, amplitude criterion is added to the phase criterion. The output signal of the multiplier provides such a measurement.

Accordingly, it is an object of this invention to provide a method of and apparatus for identifying common information in a plurality of signals.

Another object is to provide improved procedures for interpreting seismic records to identify reflections in the presence of random noise vibrations.

Another object is to provide apparatus for measuring both polarity and amplitude coherence between a plurality of electrical signals.

Other objects, advantages and features of the invention should become apparent from the following detailed description which is taken in conjunction with the accompanying drawing in which:

FIGURE 1 is a schematic circuit drawing of an embodiment of the apparatus of this invention.

FIGURE 2 is a schematic representation of the operating features of the apparatus of FIGURE 1.

Figure 3A:
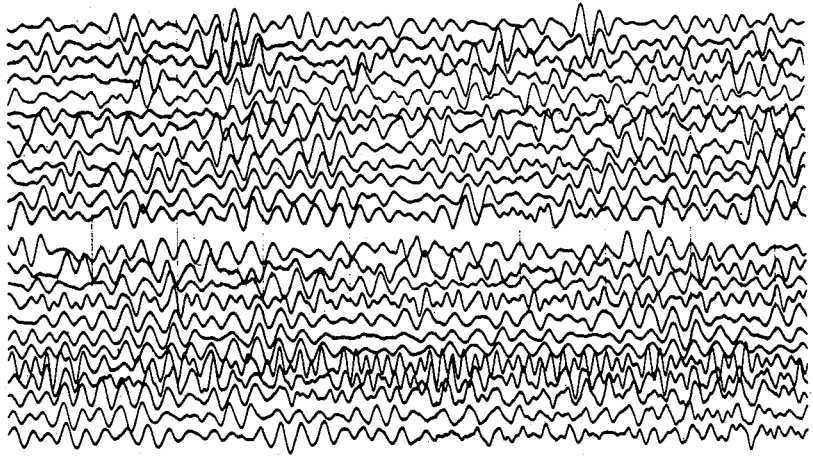
FIGURE 3a is a representation of initial seismic signals to be processed in accordance with this invention.

Referring now to the drawing in detail and to FIGURE 1 in particular, the first of a plurality of signals to be studied is applied between input terminals 10a and 11a, the latter being grounded. Terminal 10a is connected to the first input terminal 12a of a first summing network. Terminal 12a is connected by means of an input resistor 13a to the first input terminal of a summing amplifier 14. Amplifier 14, which can be a conventional high gain operational amplifier, is provided with a feedback resistor 15. Amplifier 14 has a suitable number of stages of amplification such that the output signal is in phase with the input signal. This output signal is applied through resistors 16 and 17 to the input of a second amplifier 18. Amplifier 18 is provided with a feedback resistor 19. Amplifier 18 is provided with a suitable number of stages of amplification such that the output signal at terminal 20 is 180° out of phase with the input signal to amplifier 18. A rectifier 21 is connected between ground and the junction between resistors 16 and 17. Rectifier 21 serves to remove the negative half cycles of the input signal applied to amplifier 18. Thus, the signal at terminal 20 comprises a series of negative pulses.

The output signal of amplifier 14 is also transmitted through a second network similar to the one previously described and wherein corresponding elements are designated by like primed reference numerals. The only difference between these two circuits is the polarity of rectifier 21', which results in a series of positive pulses appearing at output terminal 20'.

Input terminal 10a is also connected through a capacitor 22a and a resistor 23a to the control grid of a triode 24a. The control grid of triode 24a is connected through a rectifier 25a and a resistor 26a to a terminal 27a that is maintained at a positive potential. A terminal 28a, which is maintained at a negative potential, is connected through a resistor 29a and a rectifier 30a to the control grid of triode 24a. The first end terminal of a potentiometer 32a is connected to the junction between rectifier 25a and resistor 26a, and the second end terminal of potentiometer 32a is connected to the junction between resistor 29a and rectifier 30a. The contactor of potentiometer 32a is connected to ground. Potentiometer 32a and resistors 26a and 29a thus form a voltage dividing network such that positive and negative bias potentials are applied to rectifiers 25a and 30a, respectively. These rectifiers thereby provide a bipolar clipper such that signals having substantially a square wave shape are applied to triode 24a from input terminal 10a.

The cathode of triode 24a is connected to ground through a resistor 34a. The anode of triode 24a is connected through a resistor 35a to a terminal 36a which is maintained at a positive potential. The anode of triode 24a is also connected through a capacitor 37a, a resistor 38a and a resistor 39a to terminal 40a. A pair of diodes 43a, connected in back-to-back relationship, is connected between ground and the junction between resistors 38a and 39a. These rectifiers function as an additional clipping network so that signals having substantially a square wave configuration appear at terminal 40a. A rectifier 41a is connected between terminal 20 and terminal 40a. A rectifier 42a is connected between terminal 40a and terminal 20'. Terminal 40a is also connected to the first input terminal 45a of a second summing circuit.

The apparatus of FIGURE 1 is provided with as many individual clipping circuits as there are signals to be compared. Thus, the summing circuit previously described is provided with additional input terminals 12b, 12c . . . 12n. The clipping circuit associated with terminal 12n is also illustrated in FIGURE 1. This clipping circuit is identical to the one previously described and corresponding elements are designated by similar n reference characters.

Input terminals 45a, 45b, 45c . . . 45n are connected through respective resistors 46a, 46b, 46c . . . 46n to the first input of a summing amplifier 47. Amplifier 47 is provided with two feedback resistors 48 and 49 in series, the latter being adjustable. The output of amplifier 47 is connected through a pair of back-to-back rectifiers 50 and a resistor 51 to ground. The junction between rectifiers 50 and resistor 51 is connected to the first input terminal of a signal multiplier 53.

As previously mentioned, the signal at terminal 20 comprises a series of negative pulses which represent the negative half cycles of the sum of the signals to be compared. The signal at terminal 20' represents the corresponding positive pulses of this sum. Rectifiers 41a and 41n operate to transmit the output signal from the upper clipping circuit to the first input of summing amplifier 47 when this clipped signal is in phase with the summed output signal from amplifier 14. The operation of rectifiers 41a and 41n in this manner can readily be seen from an examination of the curves in FIGURE 2. It will be assumed that the output signal which appears at terminal 40a from triode 24a is of a square wave configuration as shown by curve 55. It will first be assumed that this signal is in phase with the sum of the individual signals being compared. Under these circumstances, the output signals at terminals 20 and 20' are of the form shown by respective curves 56 and 57 of FIGURE 2. During the first half cycle, terminal 40a is positive and terminal 20 is zero so that rectifier 41a does not conduct. Terminal 20' is positive at this same time so that rectifier 42a does not conduct. Thus, the positive half cycle of the output signal from triode 24a is transmitted as an input to summing amplifier 47. During the second half cycle, the signal at terminal 40a is negative. The signal at terminal 20 is also negative, whereas the signal at terminal 20' is zero. Again, neither of the rectifiers 41a nor 42a conducts so that a negative signal is transmitted from triode 24a to summing amplifier 47.

If the signal transmitted through triode 24a should be 180° out of phase with the sum of the initial input signals, as shown by curve 58, there is no output signal transmitted to summing amplifier 47. During the first half cycle of such a signal, terminal 40a is negative. However, the potential at terminal 20 is zero so that rectifier 41a conducts to prevent the signal at terminal 40a from being transmitted to amplifier 47. During the second half cycle, the signal at terminal 40a is positive whereas the signal at terminal 20' is zero, so that rectifier 42a conducts. Thus, the output signal from triode 24a is shorted at all times so that there is no output signal transmitted to amplifier 47.

The clipped signals from the remainder of the individual networks are also compared with summed signals at terminals 20 and 20'. The resulting transmitted signals are applied to summing amplifier 47 through respective resistors 46b, 46c . . . 46n. The magnitude of the output signal from amplifier 47 is thus representative of the number of input signals which are in phase with the sum of the input signals. Variable resistor 49 permits the gain of summing amplifier 47 to be adjusted so that an output signal is transmitted only when a preselected number of individual signals are in phase with the sum.

Figure 3B:
FIGURE 3b is a representation of signals obtained by the procedure of my prior application.

The effectiveness of the apparatus thus far described as a procedure for identifying common reflections in a plurality of seismic records is illustrated in FIGURES 3a and 3b. The curves of FIGURE 3a are typical seismic records prior to being processed by the apparatus of this invention. Electrical signals representative of the curves of FIGURE 3a are then applied as inputs to the apparatus of FIGURE 1. The procedure is repeated a number of times with the curves of FIGURE 3a being displaced from one another by amounts varying from −27° to +27°, as noted in FIGURE 3c. These displacements are arbitrary assumptions to compensate for "angularity of path" corrections of the seismic signals. The curves of FIGURE 3b represent voltages at the junction between diodes 50 and resistor 51. As noted in FIGURE 3b, there are two decided correlations of the resulting records. This indicates that common reflections appear in the records at these times.

In order to introduce amplitude criterion into the signal comparison, input terminals 10a . . . 10n are connected through respective resistors 60a . . . 60n to the input of a summing amplifier 61. Amplifier 61 is provided with an adjustable feedback resistor 62 to permit the gain of the summed signal to be adjusted. The output of amplifier 61 is applied through a rectifier 63 to the first input terminal of an amplifier 64 and through a resistor 65 to the second input terminal of amplifier 64. A second rectifier 66 is connected between ground and the first input terminal of amplifier 64. A resistor 67 is connected between the first input terminal of amplifier 64 and a terminal 68 which is connected to a source of reference potential, not shown. Amplifier 64 is provided with a feedback resistor 69. The output of amplifier 64 is connected through a pair of zener diodes 71, connected in back-to-back relationship, to the second input of multiplier 53. The second input of multiplier 53 is connected to ground through a resistor 72. The output signal from multiplier 53 is connected to an output terminal 54 which can be connected to a recorder to provide a permanent record of the correlated signal.

Rectifiers 63 and 66 and amplifier 64 provide full wave rectification of the summed output signal from amplifier 61. Diodes 71 do not conduct until the signal applied thereto exceeds a threshold value. Thereafter, the diodes become conductive to pass amplitudes greater than this threshold value to the input of multiplier 53. The magnitude of the signal passed by diodes 71 can be adjusted by resistor 62 which varies the gain of the summing amplifier. In this manner, the second input signal to multiplier 53 can be selected for any desired amplitude of the summed input signals to amplifier 61. This step adds amplitude criterion to the phase criterion in determining whether an output signal is obtained from multiplier 53 since the output signal from multiplier 53 remains zero as long as diodes 71 do not pass a second input signal to multiplier 53.

Figure 3C:
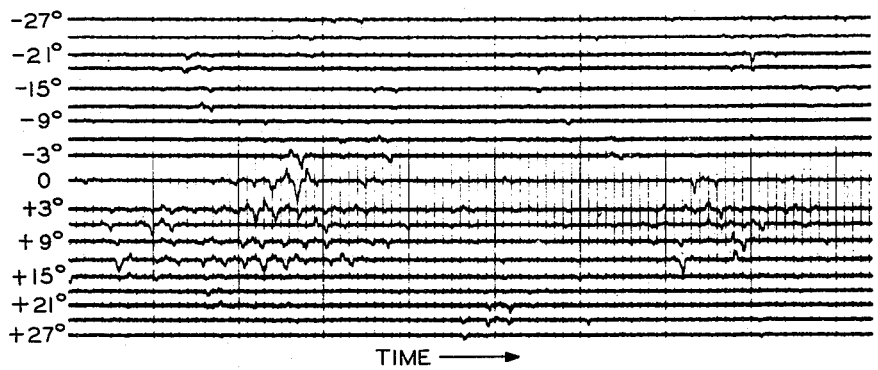
FIGURE 3c is a representation of signals obtained by the procedure of this invention.

FIGURE 3c illustrates output signals from multiplier 53 when the individual signals of FIGURE 3b constitute the first input signals to multiplier 53 and the apparatus in the lower region of FIGURE 1 provides the second input signals. A comparison of the curves of FIGURES 3b and 3c shows that the addition of amplitude criterion further aids in the identification of common reflections. The degree of this additional restriction can be varied by adjusting the gain of amplifier 61.

From the foregoing description it can readily be seen that there is provided in accordance with this invention a novel procedure and apparatus for identifying common information in a plurality of signals. While the invention has been described in conjunction with a presently preferred embodiment, it should be obvious that it is not limited thereto.

What is claimed is:

1. Apparatus for measuring common information in a plurality of signals comprising first and second signal summing means, said first summing means being adapted to receive said plurality of signals as inputs, a plurality of signal comparing means, each adapted to transmit a signal when input signals thereto are in phase, means connecting the output of said first summing means as a first input to each of said comparing means, means connecting said plurality of signals as second inputs to respective ones of said comparing means, means connecting the outputs of said comparing means to the input of said second summing means, a signal multiplier, means connecting the output of said second summing means to the first input of said multiplier, third signal summing means, means to apply said plurality of signals to the input of said third summing means, and means connecting the output of said third summing means to the second input of said multiplier.

2. Apparatus for measuring common information in a plurality of signals comprising first and second signal summing means, said first summing means being adapted to receive said plurality of signals as inputs, a plurality of signal comparing means, each adapted to transmit a signal when input signals thereto are in phase, means connecting the output of said first summing means as a first input to each of said comparing means, means connecting said plurality of signals as second inputs to respective ones of said comparing means, means connecting the outputs of said comparing means to the input of said second summing means, a signal multiplier, means connecting the output of said second summing means to the first input of said multiplier, third signal summing means, means to apply said plurality of signals to the input of said third summing means, full wave rectifying means, means connecting the output of said third summing means to the input of said rectifying means, and means connecting the output of said rectifying means to the second input of said multiplier.

3. The apparatus of claim 2, further comprising means to adjust the gain of said second summing means selectively so as to provide a signal to the first input of said multiplier only when a preselected number of said plurality of signals are in phase with the output of said first summing means.

4. The apparatus of claim 2, further comprising means to adjust the amplitude of the signal applied to the second input of said multiplier.

5. Apparatus for measuring common information in a plurality of electrical signals comprising a plurality of bipolar signal clipping means, each adapted to receive one of the plurality of electrical signals at its input, a first signal summing means, means connecting the inputs of said clipping means to the input of said first summing means, first and second terminals, a signal clipping means connecting the output of said first summing means to said first terminal so as to eliminate signals of amplitude less than a preselected value, a signal clipping means connecting the output of said first summing means to said second terminal so as to eliminate signals of amplitude greater than a preselected value, a second signal summing means, means connecting the outputs of said bipolar signal clipping means to the input of said second summing means, a plurality of unidirectional current flow means connecting said first and second terminals to the outputs of said bipolar clipping means so that the output signals from said bipolar clipping means are transmitted to said second summing means only when the output signals from said bipolar clipping means are in phase with the output signal from said first summing means, a signal multiplier, means connecting the output of said second summing means to the first input of said multiplier, third signal summing means, means to apply said plurality of signals to the input of said third summing means, full wave rectifying means, means connecting the output of said third summing means to the input of said rectifying means, and means connecting the output of said rectifying means to the second input of said multiplier.

No references cited.

MALCOLM A. MORRISON, *Primary Examiner.*

DARYL W. COOK, *Examiner.*